(12) United States Patent
Simpson

(10) Patent No.: US 10,443,391 B2
(45) Date of Patent: Oct. 15, 2019

(54) GAS TURBINE ENGINE STATOR VANE ASYMMETRY

(71) Applicant: United Technologies Corporation, Hartford, CT (US)

(72) Inventor: Alex J. Simpson, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 538 days.

(21) Appl. No.: 14/713,103

(22) Filed: May 15, 2015

(65) Prior Publication Data

US 2016/0160665 A1   Jun. 9, 2016

Related U.S. Application Data

(60) Provisional application No. 62/002,235, filed on May 23, 2014.

(51) Int. Cl.
| | |
|---|---|
| *F01D 9/04* | (2006.01) |
| *F01D 5/14* | (2006.01) |
| *F01D 5/26* | (2006.01) |
| *F01D 25/06* | (2006.01) |
| *F04D 29/54* | (2006.01) |

(52) U.S. Cl.
CPC ............... *F01D 5/141* (2013.01); *F01D 5/26* (2013.01); *F01D 9/041* (2013.01); *F01D 25/06* (2013.01); *F04D 29/544* (2013.01); *F05D 2260/961* (2013.01); *Y02T 50/673* (2013.01)

(58) Field of Classification Search
CPC . F01D 5/141; F01D 5/26; F01D 9/041; F05D 2260/961; F04D 29/544
USPC .......................................................... 415/195
See application file for complete search history.

(56) References Cited

U.S. PATENT DOCUMENTS

| | | | | |
|---|---|---|---|---|
| 4,253,800 A | * | 3/1981 | Segawa | F01D 5/10 415/119 |
| 4,878,810 A | | 11/1989 | Evans | |
| 5,524,341 A | | 6/1996 | Ferleger et al. | |
| 6,379,112 B1 | | 4/2002 | Montgomery | |
| 6,471,482 B2 | | 10/2002 | Montgomery et al. | |
| 6,814,543 B2 | | 11/2004 | Barb et al. | |
| 7,097,420 B2 | * | 8/2006 | Cormier | F01D 9/041 29/889.22 |
| 8,043,063 B2 | | 10/2011 | Kelly et al. | |
| 8,172,510 B2 | | 5/2012 | Duong et al. | |
| 8,429,816 B2 | * | 4/2013 | Spracher | F01D 5/26 29/889 |
| 2012/0099995 A1 | * | 4/2012 | Delvaux | F01D 5/30 416/203 |

(Continued)

*Primary Examiner* — Richard A Edgar
*Assistant Examiner* — Michael L Sehn
(74) *Attorney, Agent, or Firm* — Carlson, Gaskey & Olds, P.C.

(57) ABSTRACT

A gas turbine engine includes an array of airfoils that include first and second segments. The first segment includes a first number of airfoils that are circumferentially spaced from one another a first angular spacing. The second segment includes a second number of airfoils that are circumferentially spaced from one another a second angular spacing. A sum of the first and second number of airfoils corresponds to a total number of airfoils in the array. The first angular spacing is based upon a first effective number of total airfoils in the array that is different than the total number of airfoils.

14 Claims, 2 Drawing Sheets

(56) References Cited

U.S. PATENT DOCUMENTS

| | | |
|---|---|---|
| 2013/0052021 A1 | 2/2013 | Hayaford et al. |
| 2013/0142640 A1 | 6/2013 | Houston et al. |
| 2013/0142659 A1 | 6/2013 | Glaspey |
| 2014/0044546 A1* | 2/2014 | Geppert .................... F01D 5/10 |
| | | 416/203 |

* cited by examiner

GAS TURBINE ENGINE STATOR VANE ASYMMETRY

CROSS-REFERENCE TO RELATED APPLICATIONS

This application claims priority to U.S. Provisional Application No. 62/002,235 which was filed on May 23, 2014 and is incorporated herein by reference.

BACKGROUND

This disclosure relates to an array of airfoils within a stage of a gas turbine engine, for example, a turbine stator vane array.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The compressor and turbine section includes circumferential arrangements of fixed and rotating stages. Structural vibratory coupling between circumferentially and axially adjacent airfoils can occur during engine operation. For rotating stages of the engine, blade mistuning has been used in which there are two sets of blades arranged in circumferentially alternating relationship to provide an even numbered blade array. One set of blades has a different characteristic than the other set of blades to provide two different resonant frequencies. For fixed stages, vanes have been mistuned by providing different sets of vanes in adjacent quadrants of the array.

A significant driver for turbine blade vibration is the pressure distortion produced by nearby turbine vanes. Each successive vane passing by produces a pressure fluctuation on the blade such that if the product of the number of pressure disturbances per revolution and the rotational speed of the blade lines up with a fundamental frequency of the blade, then a vibratory response leading to potential high-cycle fatigue (HCF) failure could result. One technique for mitigating this effect is to use two sectors of vanes each of which contain differing vane geometries and number of vanes from each other, though the vane spacing within each sector is uniform and equal to 360 degrees divided by an integer representing the vane count if the pattern were extended around the entire annulus. This has the effect of reducing the strength of the periodic pressure disturbance from the vanes at the original frequency of concern.

SUMMARY

In one exemplary embodiment, a gas turbine engine includes an array of airfoils that include first and second segments. The first segment includes a first number of airfoils that are circumferentially spaced from one another a first angular spacing. The second segment includes a second number of airfoils that are circumferentially spaced from one another a second angular spacing. A sum of the first and second number of airfoils corresponds to a total number of airfoils in the array. The first angular spacing is based upon a first effective number of total airfoils in the array that is different than the total number of airfoils.

In a further embodiment of the above, the array includes two arcuate segments that are each approximately 180°.

In a further embodiment of any of the above, the first effective number of total airfoils in the array is a fractional number.

In a further embodiment of any of the above, the first angular spacing is 360° divided by the first effective number of total airfoils in the array.

In a further embodiment of any of the above, the first effective number of total airfoils in the array is an integer plus 0.5.

In a further embodiment of any of the above, the first and second numbers of airfoils are different than one another.

In a further embodiment of any of the above, the second angular spacing is based upon a second effective number of total airfoils in the array that is different than the total number of airfoils.

In a further embodiment of any of the above, the second effective number of total airfoils in the array is a fractional number.

In a further embodiment of any of the above, the second angular spacing is 360° divided by the second effective number of total airfoils in the array.

In a further embodiment of any of the above, the second effective number of total airfoils in the array is an integer plus 0.5.

In a further embodiment of any of the above, the first effective number of total airfoils in the array is different than the second effective number of airfoils in the array.

In a further embodiment of any of the above, the first effective number of airfoils in the array corresponds to the second effective number of airfoils in the array plus an integer.

In a further embodiment of any of the above, there is a turbine section and the array is arranged in the turbine section.

In a further embodiment of any of the above, the turbine section includes a fixed stator section and a rotating section. The first and second number of airfoils are arranged in the fixed stator section.

In a further embodiment of any of the above, the array of airfoils is configured to produce a forcing function for the rotating section that is approximately 180° out of phase with a subsequent revolution of the rotating section.

In a further embodiment of any of the above, the first and second effective numbers of total airfoils in the array are fractional numbers.

In a further embodiment of any of the above, the first and second angular spacings each respectively correspond to 360° divided by the first effective number of total airfoils in the array and 360° divided by the second effective number of total airfoils in the array.

In a further embodiment of any of the above, the first effective number of total airfoils in the array is an integer plus 0.5. The second effective number of total airfoils in the array is another integer plus 0.5.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
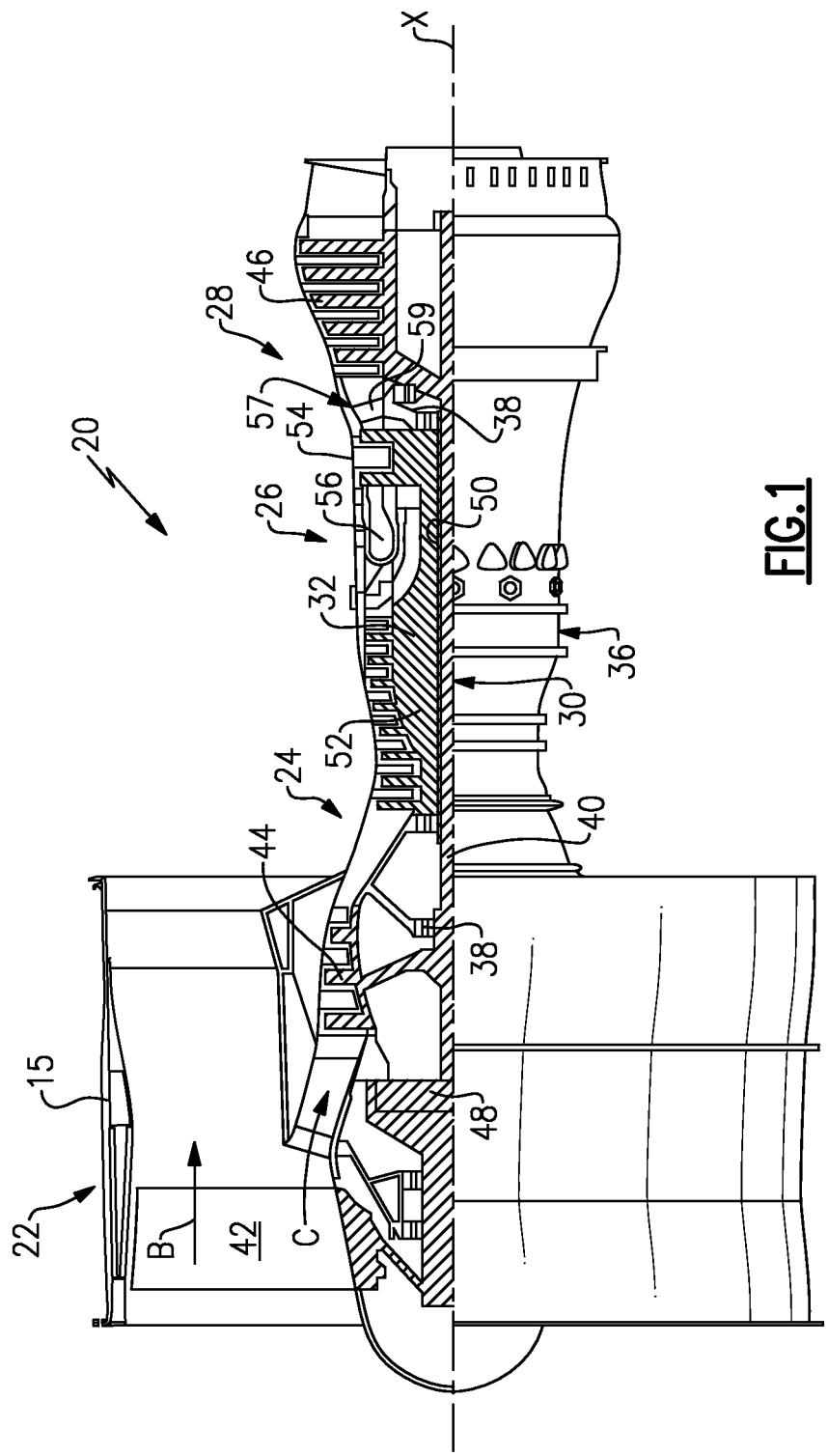
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
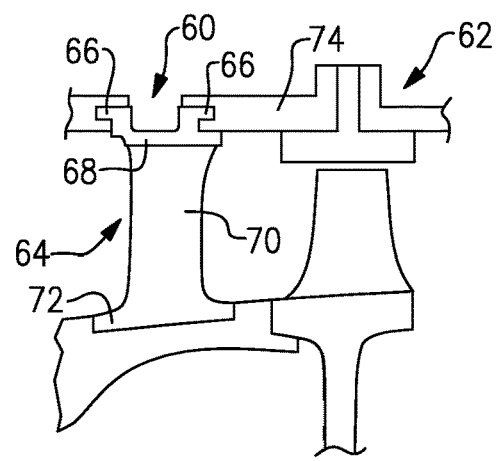
FIG. 2 is a schematic view through an engine section including a fixed stage and a rotating stage.

Referring to FIG. 2, a portion of an engine section is shown, for example, a turbine section. It should be understood, however, that disclosed section also may be provided in a compressor section.

The section includes a fixed stage 60 that provides a circumferential array of vanes 64 arranged axially adjacent to a rotating stage 62. In the example, the vane 64 includes an outer diameter portion or platform 68 having hooks 66 that support the array of vanes 64 with respect to a case structure 74. An airfoil 70 extends radially from a platform of the outer diameter portion 68. In the example illustrated, the vanes 64 are supported by an inner diameter portion or platform 72. It should be understood that the disclosed vane arrangement could be used for vane structures having a cantilevered inner diameter portion of the airfoil.

Figure 3:
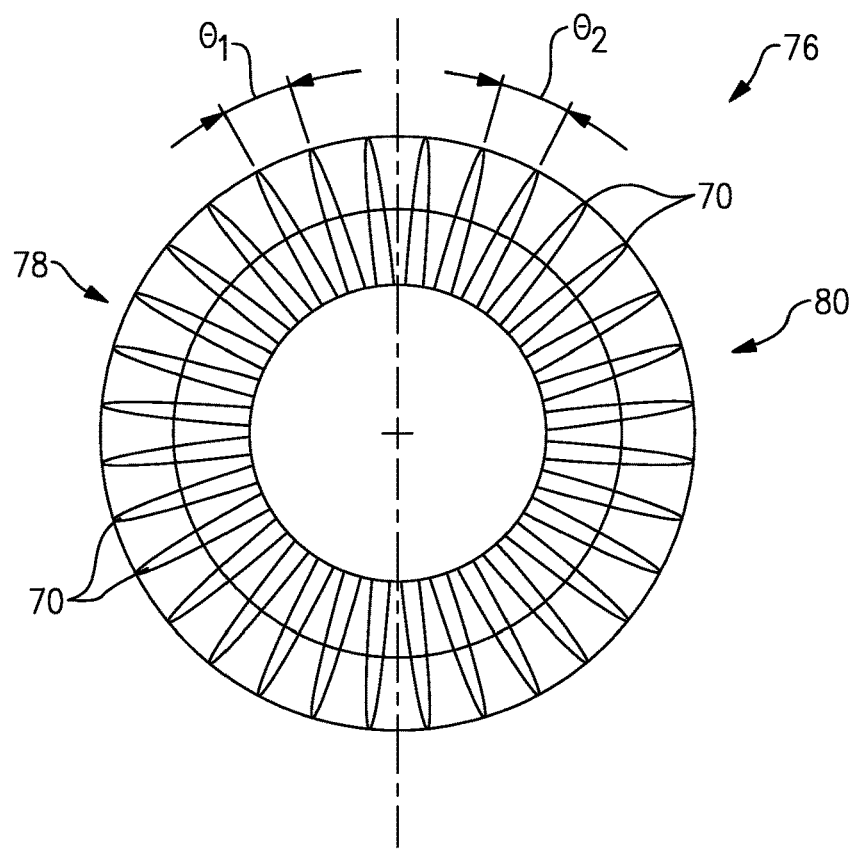
FIG. 3 is a schematic view of first and second segments of stator vanes.

An array 76 of airfoils 70 is arranged in first and second segments 78, 80, as shown in FIG. 3. The array of stator vanes may be provided as singlets, doublets, a full ring, ring halves or other multiples. The first segment 78 includes a first number of airfoils circumferentially spaced from one another a first angular spacing $\theta_1$. The second segment includes a second number of airfoils circumferentially spaced from one another a second angular spacing $\theta_2$. A sum of the first and second number of airfoils corresponds to a total number of airfoils in the array. The first angular spacing is based upon a first effective number of total airfoils in the array that is different than the total number of airfoils as defined by equation 3. Said another way, the effective number of airfoils in the first set is based on the angular spacing of the airfoils per equation 3. This number in general need not be an integer.

In the example, the array 76 includes two arcuate segments of vane sets that are each approximately 180° of the flow path annulus. Within each set, the angular spacing ($\theta_1$, $\theta_2$), or pitch, is not equal to 360° divided by an integer. Instead, the first effective number of total airfoils in the array is a fractional number. The first angular spacing is 360° divided by the first effective number of total airfoils in the array. In one example, the first effective number of total airfoils in the array is an integer plus 0.5, or said another way, one half of an odd integer. In one example, the integer corresponds to the sum of first and second number of airfoils. In one example, the first and second number of airfoils are different than one another, as shown in FIG. 3.

The second annular spacing is based upon a second effective number of total airfoils in the array that is different than a total number of airfoils as defined by equation 4. Said another way, the effective number of airfoils in the second set is based on the angular spacing of the airfoils per equation 4. This number in general need not be an integer. The second effective number of total airfoils in the array is a fractional number such that the second angular spacing is 360° divided by the second effective number of total airfoils in the array. In one example, the second effective number of total airfoils in the array is a different integer plus 0.5. It is desirable, though maybe not necessary, that the difference between the "effective" 360 degree counts from the two sets to be greater than 1. If this pattern from one set with an integer count plus 0.5 is extended around the full annulus one half of the vane pattern would be missing. Where the denominator of the ratio can be interpreted as the number of vanes resulting if the spacing were extended over the full annulus, the result is a non-integral or fractional vane count. The angular position of one segment is adjusted relative to the other to reduce the discrepancy in vane spacing between segments.

The array of airfoils is configured to produce a forcing function for the stage 62 that is about 180° out of phase with a subsequent revolution of the rotating section. This effect is cumulative with the difference in vane count between the two segments. In some instances, there is an additional predicted 20% reduction in the strength of the forcing function over what is achievable in prior art vane mistuning arrangements.

Example calculations illustrating the relationship between the vane spacing within the first and second segments 78, 80 is illustrated in the example equations below.

$$NV_1 = NV_2 + I, \qquad \text{Equation 1}$$

where I is an integer, for example, 1,
$NV_1$ is a first effective number of airfoils in the stage, and
$NV_2$ is second effective number of airfoils in the stage, and where $NV_1$ and $NV_2$ are fractional numbers.

In one example, where $NV_2$ may be calculated in a variety of ways, for example, as indicated by Equation 2 below.

$$NV_2 = \frac{I_{odd}}{2}, \qquad \text{Equation 2}$$

where $I_{odd}$ is an odd integer, for example, $(NV_{total} \times 2) - 1$, where
$NV_{total}$ is the total number of airfoils in the stage.

So, in one example, where the total number of airfoils, $NV_{total}$, in a stage is 30, $I_{odd}$ is 57 and $NV_2$ is 28.5. Thus, where I is 3, $NV_1$ is 31.5. Accordingly, both $NV_1$ and $NV_2$ are fractional numbers in the example. In another example, the angular spacing of the first set is 11 degrees, which by equation 3 gives and effective count of about 32.7, while the angular spacing of the second set is 13 degrees, which gives an effective count of about 27.7. In the second example, 15 airfoils in each set would result in a total airfoil count of 30.

With the effective airfoil numbers for each segment calculated, the spacing or pitch between airfoils for each segment can be calculated according to the following equations.

$$\theta_1 = \frac{360°}{NV_1}, \qquad \text{Equation 3}$$

where $\theta_1$ is the angular spacing of the first segment of airfoils.

$$\theta_2 = \frac{360°}{NV_2}, \qquad \text{Equation 4}$$

where $\theta_2$ is the angular spacing of the second segment of airfoils.

As an example for 36 total vanes, there are few arrangements that are possible. While 35.5 and 36.5 may work geometrically, the responses from the two sets are too close in frequency. The vane counts 34.5 and 37.5 (36+/−1.5) are optional configurations and 32.5 and 39.5 (36+/−3.5). In another example, 36+/−2.5 appears to produce larger gaps, but also conceivable. In any event, the individual counts are not limited to the total count+/−0.5.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   an array of airfoils including first and second segments, the first segment including a first number of airfoils circumferentially spaced from one another by a first angular spacing, the second segment including a second number of airfoils circumferentially spaced from one another by a second angular spacing, a sum of the first and second number of airfoils corresponding to a total number of airfoils in the array, the first angular spacing based upon a first effective number of total airfoils in the array that is different than the total number of airfoils, wherein the first effective number of total airfoils in the array is an integer plus 0.5, wherein each of the first and second number of airfoils is at least three.

2. The gas turbine engine according to claim 1, wherein the array consists of two arcuate segments that are each approximately 180°.

3. The gas turbine engine according to claim 1, wherein the first angular spacing is 360° divided by the first effective number of total airfoils in the array.

4. The gas turbine engine according to claim 1, wherein the first and second numbers of airfoils are different than one another.

5. The gas turbine engine according to claim 1, comprising a turbine section, wherein the array is arranged in the turbine section.

6. The gas turbine engine according to claim 5, wherein the turbine section includes a fixed stator section and a rotating section, the first and second number of airfoils arranged in the fixed stator section.

7. The gas turbine engine according to claim 6, wherein the array of airfoils is configured to produce a forcing function for the rotating section that is approximately 180° out of phase with a subsequent revolution of the rotating section.

8. The gas turbine engine according to claim 1, wherein the first effective number of total airfoils and a second effective number of total airfoils in the array are fractional numbers.

9. The gas turbine engine according to claim 8, wherein the first and second angular spacings each respectively correspond to 360° divided by the first effective number of total airfoils in the array and 360° divided by the second effective number of total airfoils in the array.

10. The gas turbine engine according to claim 1, wherein a second effective number of total airfoils in the array is another integer plus 0.5.

11. A gas turbine engine comprising:
an array of airfoils including first and second segments, the first segment including a first number of airfoils circumferentially spaced from one another a first angular spacing, the second segment including a second number of airfoils circumferentially spaced from one another a second angular spacing, a sum of the first and second number of airfoils corresponding to a total number of airfoils in the array, the first angular spacing based upon a first effective number of total airfoils in the array that is different than the total number of airfoils, wherein the second angular spacing is based upon a second effective number of total airfoils in the array that is different than the total number of airfoils, wherein the second effective number of total airfoils in the array is an integer plus 0.5, wherein each of the first and second number of airfoils is at least three.

12. The gas turbine engine according to claim 11, wherein the second angular spacing is 360° divided by the second effective number of total airfoils in the array.

13. A gas turbine engine comprising:
an array of airfoils including first and second segments, the first segment including a first number of airfoils circumferentially spaced from one another a first angular spacing, the second segment including a second number of airfoils circumferentially spaced from one another a second angular spacing, a sum of the first and second number of airfoils corresponding to a total number of airfoils in the array, the first angular spacing based upon a first effective number of total airfoils in the array that is different than the total number of airfoils, wherein the second angular spacing is based upon a second effective number of total airfoils in the array that is different than the total number of airfoils, wherein the first effective number of airfoils in the array corresponds to the second effective number of airfoils in the array plus an integer, wherein each of the first and second number of airfoils is at least three; and
wherein the first segment and second segment are each a single contiguous arcuate segment that is approximately 180°.

14. The gas turbine engine according to claim 13, wherein the first effective number of total airfoils in the array is different than the second effective number of airfoils in the array.

* * * * *